March 2, 1965  E. M. MAXEY  3,171,699

LOW-TORQUE BUSHING AND COMPOSITION

Filed Dec. 6, 1962

INVENTOR
Edwin M. Maxey
BY McCoy, Greene, Medest
+ Te Grotenhuis
ATTORNEYS

United States Patent Office 3,171,699
Patented Mar. 2, 1965

3,171,699
LOW-TORQUE BUSHING AND COMPOSITION
Edwin M. Maxey, Stow, Ohio, assignor to The General Tire & Rubber Company, Akron, Ohio, a corporation of Ohio
Filed Dec. 6, 1962, Ser. No. 242,813
10 Claims. (Cl. 308—26)

This invention relates to low-torque bushing assemblies having means for insulating internal and external members from relative vibration and shock, and for providing low friction bearing surfaces against which members in relative motion may slide or rotate.

Insulating inserts for cushioned bushing assemblies have normally been formed of a natural or synthetic rubber material, the insert being held under a high compression between the inner and outer sleeve members. While the rubber material provides a desirable modulus of elasticity for insulating vibration and shock between the inner and outer sleeves, except to the extent that the rubber is deformed, such material is unable to provide for the rotation or sliding of the metal sleeve members relative to each other. When the relative rotation of metal members became more than could be accommodated by distortion of the rubber so that the rubber surfaces were exposed to a high friction, the material deteriorated rapidly, lost its effectiveness as a mechanical insulator and eventually failed. Various lubricating materials proved ineffective in solving this problem as they tend to degrade the rubber and shorten the life of the bushing.

One comparatively effective solution comprised the insertion of a low friction plastic material between the inner surface of the rubber insert and the inner metal sleeve or shaft. The inner surface of the low friction insert provided a suitable arrangement to accommodate for occasional sliding or rotation of the parts relative to each other. Furthermore, a suitable lubricant could be retained in grooves in the inner surface of the low frictional material. Such an arrangement, however, made assembly difficult and resulted in a higher cost of manufacture.

Attempts to provide joints wherein the metal members were separated by lubricating solids based on Delrin (a trade name for a solid polyformaldehyde resin) or nylon were unsatisfactory for the insert as they tended to crack when the bushing was subjected to jolts and shock which were encountered under normal conditions. These materials had little if any shock absorption capacity but they did, however, sometimes provide the desired low co-efficient of friction and could be made self-lubricating.

It is an object of the present invention to provide a low torque bushing assembly having a molded resilient annular insert formed of a low friction material and capable of withstanding jolts and shocks that may be encountered.

Another object of the present invention is to provide a composition for a low friction molded insert to be used in a low torque bushing assembly which may be lubricated during use without danger of degrading the insert.

A still further object of the invention is to provide a permanently lubricated cushioned bushing assembly in which the inner sleeve may have substantial rotation within a bearing member with a minimum of friction.

Other objects, uses and advantages of this invention will become apparent from the following description as illustrated in the accompanying drawing in which the parts are designated by the numerals of reference throughout the several views. In the drawing.

I have found that a rubbery urethane when compounded with certain proportions of graphite and an oily silicone to provide, when cured and shaped, a material of suitable hardness, will provide both shock absorption and permanent lubrication. The assembly of the present invention generally comprises an annular insert of a low friction graphite-silicone oil loaded rubbery polyurethane material assembled between rigid inner and outer members which are usually tubular in shape. The annular insert is preferably molded to fit tightly inside the outer tubular member so that there is a slight radial compression of the polyurethane material near the outer surface of the insert. The inner sleeve which may be a shaft may rotate within the insert and slide under axial stresses.

Figure 1:
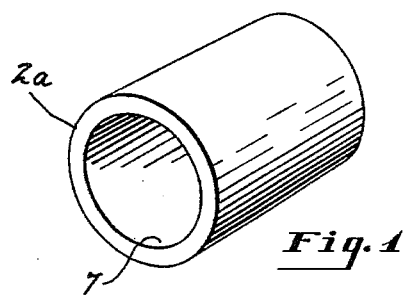
FIGURE 1 is an isometric drawing of a low-friction insert embodying the present invention in its molded or cast state.
Figure 2:
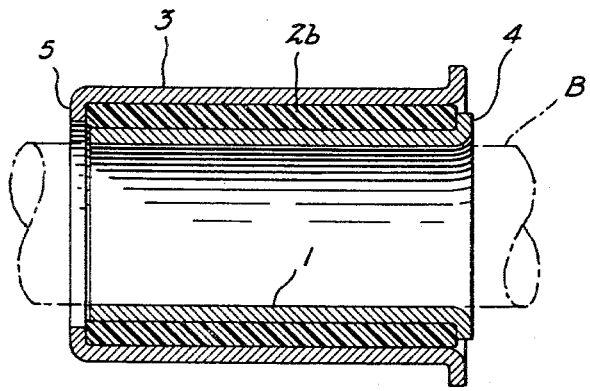
FIGURE 2 is a longitudinal section of a bushing assembly including the low-friction insert of FIGURE 1, after it has been radially compressed and axially elongated and taken on the line 2—2 of FIGURE 3.
Figure 3:
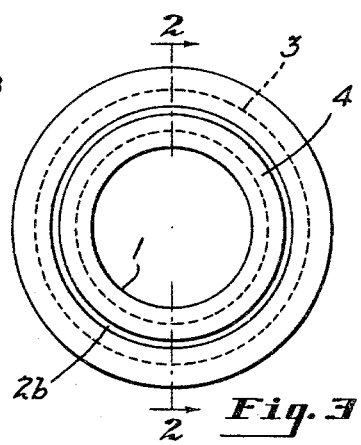
FIGURE 3 is an end elevation of the same assembly.

Referring more particularly to the drawings, there is shown a low-torque bushing assembly utilizing a polyurethane insert possessing the unique properties of the material embodied in the invention. The insert is interposed between an outer supporting member (not shown) and an inner shaft or pin B which turns relative to the outer supporting member. The assembly comprises a rigid inner tubular member or sleeve 1, a rigid outer tubular member or sleeve 3 concentric to the member 1 and a concentric tubular insert 2b compressed between (separating) and bearing against members 1 and 3. The inner and outer sleeves 1 and 3 are preferably formed of steel or other metal. As herein shown, the inner sleeve 1 has an internal diameter corresponding to or smaller than the outer diameter of the shaft or pin B and preferably has an outwardly flanged portion 4 at one end as shown in FIGURE 2. The inner surface of the flanged portion 4 engages one end of the polyurethane insert to provide lateral supporting means therefor. The polyurethane base insert 2a of FIGURE 1 preferably has an opening therein, at least after it is inserted into the outer sleeve 3, somewhat smaller in diameter than the outer diameter of the member 1 so it is radially compressed by insertion of the member 1. However, the degree of compression if any may be so slight that special means is not required for assembly of the bushing. The outer tubular member or sleeve 3 may hold the polyurethane insert in slight compression which is sufficient to resist relative rotation between the member 3 and the member 2b. One end of the outer tubular member or sleeve 3, opposite the flanged portion 4 of the inner tubular member or sleeve 1, has an inwardly flanged portion 5 as shown in FIGURE 2, the inward surface of which engages one end portion of the polyurethane insert 2a, to provide means for lateral retention of the tubular member or sleeve 2a within the assembly.

Figure 4:
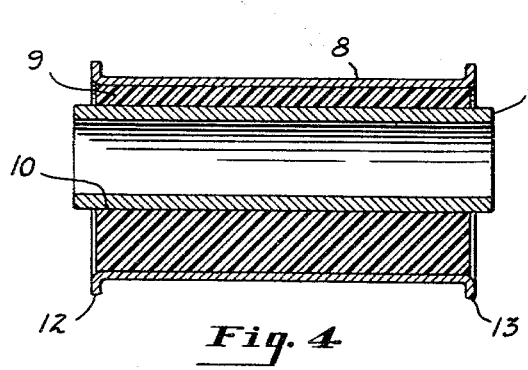
FIGURE 4 is a longitudinal section of a modified form of bushing assembly embodying the invention and taken along the line 4—4 of FIGURE 5.
Figure 5:
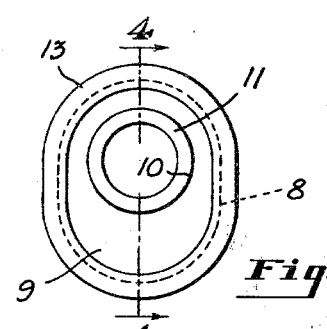
FIGURE 5 is an end elevation of the same assembly shown in FIGURE 4.

FIGURES 4 and 5 show a modified form of the invention wherein the outer sleeve comprises an elliptical member 8 and the polyurethane insert 9 has an off-center opening 10 for receiving the inner member 11. The ends 12 and 13 of the outer member 8 are flanged outwardly as shown in FIGURE 4 to facilitate assembly. The polyurethane insert 9 which is formed of the unique composition embodying the invention, may be slightly radially compressed between the outer and inner members 8 and 11 but in many applications will be formed to fit unstressed in its assembled position. A lubricant such as grease may be applied to the surfaces of the insert before assembly without danger of degrading of the material. Such a lubricant, while unnecessary, is sometimes desired during the life of the bushing to reduce friction between parts in relative movement.

This modification is especially desirable where a shaft or pin is adapted to absorb more shock or bear a greater lateral load in one direction than in others or where the outer member 8 must be adapted to an off-center mounting. Other modifications of the invention may be used to meet the requirements of various conditions and applications. The bushings shown may be assembled as is customary or as shown in U.S. Patent No. 2,872,727, by merely sliding the interfitting parts together with the usual conical leader member (not shown) to enlarge the internal diameter of the opening defined by the inner tubular wall 7 of the insert 2a (FIGURE 1).

The bushing of the present invention is particularly useful as it minimizes friction and wear and has a long, useful life. Furthermore, lubricants such as grease when used in the assembly will not degrade the polyurethane insert as they will rubber. These advantages are due to the unique properties of the material used for the molded annular insert.

The mechanical properties which were found to affect the life and performance of bushing assemblies during their normal commercial application are high modulus of elasticity, low coefficient of friction and high lubricity.

As is indicated above, the present invention is based on my discovery that polyurethane rubbers when properly compounded with certain amounts of graphite and silicone oil and of suitable hardness provide a bushing which far outlasts those heretofore prepared and gives life which may be many times that required in commercial use.

In evaluating my discovery, a bushing assembly having a polyurethane insert of the type embodied in the invention was subjected to a radially loaded, torsionally oscillating life test in which it withstood 1,000,000 cycles with no sign of wear or failure whatsoever. These results were far superior to those for any other material tested.

In contrast, bushing assemblies having an insert of natural rubber compounded for slipping type bushing use when subjected to the same life test had an average life at complete failure of only 1300 cycles.

The polyurethane which should be of a rubbery nature when cured serves as the binder and shock absorbing element of the composition. The graphite together with the silicone oil cooperate in providing permanent lubrication. They also, with the polyurethane, effect hardness.

From the many experimental compositions that I have prepared and tested it was found that an important factor in the life of the bushing is hardness of the composition. When the composition is too soft, it may have a tendency for permanent set with resultant looseness in the joints and when the composition is too hard, the brittleness and friability are increased. The hardness of the final composition is determined by both the hardness of the gum polyurethane binder and the amount of the graphite and silicone oil contained therein. Larger proportions of graphite cause an increased hardness whereas the silicone oil has a very slight plasticizing effect in the amounts used. When larger proportions of graphite are present, the unloaded or unpigmented polyurethane gum in the cured state should be softer to obtain the same hardness in the final composition.

The hardness of the composition should for best results be from about 30 to 55 on the ASTM D1706–61 Durometer D scale although hardness reading as low as 20 Durometer D scale and as high as 80 Durometer D scale may be used for most commercial applications. The urethane insert is generally prepared by casting a solidifiable (rubber forming) liquid prepolymer of an isocyanate and polyol containing the graphite and silicone oil therein and suitable excess isocyanate and crosslinking agent to set into the rubbery state. If the bushing is prepared by casting technique without use of pressure to cause flow of the liquid mixture, then the amount of graphite and silicone oil present in the composition may be limited by the flowability of the composition. However, when the bushing is molded under pressure or cast by injection under pressure, higher proportions of graphite may be used than may be used in the ordinary pour casting technique.

The rubbery polyurethane binder which is made by reacting a polyol with a diisocyanate may be prepared either from a polyether polyol or from a polyester polyol as described in one or more of the following patents or applications:

*U.S. applications*

Keplinger, S.N. 773,812, filed Nov. 14, 1958
Gruber et al., S.N. 535,280, filed Sept. 19, 1955

*U.S. patents*

Muller, 2,620,516, issued Dec. 9, 1952
Seeger, 2,625,531, issued Jan. 13, 1953
Westin, 2,625,635, issued Jan. 13, 1953
Langerak, 2,692,873, issued Oct. 26, 1954
Langerak, 2,692,874, issued Oct. 26, 1954

*Foreign patents*

Italy, 618,076, issued Feb. 24, 1961

The disclosures of these references are incorporated in the application and made a part hereof.

The polyester polyols which are used for reaction with the diisocyanate are prepared by reacting a glycol or a polyether glycol such as 1,4-tetra methylene glycol, polyethylene glycol, polypropylene glycol, or a mixed polyethylene-propylene glycol with a dicarboxylic acid in such proportions so as to produce a relatively high molecular weight polyester having hydroxyl end groups. The molecular weight of the polyester should be above 500 and preferably should be above 1000 and less than 3000 although polyesters with a molecular weight of up to 5000 may be used.

When the polyols used for reaction with the polyisocyanate are polyether glycols prepared from alkylene oxide such as ethylene, propylene or butylene oxides etc. or mixtures of one or more of these they should also have a molecular weight above 500 and below 5000 and have two hydroxyl groups per molecule.

The total organic polyisocyanate used for reaction with the polyols in preparing the polyurethane rubber should preferably be somewhat in excess. However, in forming a liquid prepolymer for casting procedure, either the polyol or the isocyanate should be sufficiently in excess so that substantially all of the active groups are either all —NCO groups or all hydroxyl groups. A tertiary amine catalyst is usually present to facilitate the reaction. Just before casting the compositions, additional isocyanate (if hydroxyl end groups were present) or cross-linking agent such as a triol or a polyamine etc. suitable for reacting with isocyanate (if isocyanate end groups were present) is added because of the linking up of the prepolymer chains and crosslinking thereof.

The greater the proportion of the isocyanate used and the lower the molecular weight of the polyol, the greater is the tendency to provide a more rigid polyurethane composition. The rigidity of the composition is also increased by the addition of ingredient having more than two groups for reacting with the isocyanate or an ingredient such as di- or tri-primary amines or trimethylol propane etc. which have more than two active hydrogens for reacting with the isocyanates. The general methods of making polyurethane rubbers and of increasing the hardness and decreasing the rigidity is, of course, well-known in the art and forms no part of the present invention.

The organic polyisocyanates used are also well-known, the most commonly used being tolylene diisocyanate, which is a mixture of the isomers, and M.D.I. which is a 4,4'-methylenebis (phenyl isocyanate), although other polyisocyanates may, of course, be used if desired.

The following example (parts are by weight) illustrates a composition suitable for the shock absorbing permanent lubricating portion of the bushings of the present invention:

| | |
|---|---|
| Du Pont Adiprene L100 | 100 |
| 80/20 tolylene diisocyanate (2,4/2,6-) | 4.2 |
| MOCA (methylene bis o-chloro aniline) | 16 |
| Graphite—Dixon 620 grade | 15 |
| Dow 500 viscosity dimethyl silicone oil | 10 |

In the above, the Du Pont Adiprene L100 is a polyurethane prepolymer of tolylene diisocyanate and tetra methylene ether glycol of flowable consistency. The MOCA serves in the above composition both as a catalyst for activating the reaction and also as a crosslinking agent. The graphite and the dimethyl silicone oil are lubricants which also have a substantial effect on hardness of the composition.

In the preparation of the above compound, the graphite and silicone oil are thoroughly mixed into the prepolymer together with the MOCA. The tolylene diisocyanate is then preferably added and the material poured into suitable molds to provide bushings of the shape desired which have a radial thickness substantially greater than that desired in the final bushing. The composition is allowed to set up and thoroughly react either at room temperature or at a slightly elevated emperature in accordance with the time desired.

In the above composition the graphite may be reduced to as little as 10 parts and the silicone oil may be reduced to as little as 2 parts. In such instances, it is preferable, however, to slightly increase the added tolylene diisocyanate although such is not necessary for most commercial applications. The graphite may also be increased to as much as 50 or even 60 parts. However, in such instances, the pourability of the composition is such that super atmospheric pressure may be required to cause it to fill the mold. A pressure or injection molding is usually therefore required. In general, the graphite should be present in quantities of from 10 to 30 parts and the silicone oil from 5 to 15 parts.

Now, in the above composition, the Adiprene L100 may be substituted by other prepolymer capable of setting with or without additional isocyanate to the rubbery state. The proportions of the ingredients should be regulated to provide the desired hardness.

The silicone oil in the above example may be substituted in whole or in part by other silicone oils such as those prepared by condensing primarily diphenyl silane diol, methyl phenyl silane diol, di-ethyl silane diol, etc. with a sufficient amount of triorgano silicone to suitably end block the polymer and form a stable silicone oil.

Having described my invention, I claim:

1. A low-torque bushing assembly comprising two rigid tubular members positioned one within the other; an intermediate tubular member positioned between the said rigid members, said intermediate member having an internal configuration substantially equal to the external configuration of said inner member, said intermediate tubular member comprising a rubbery polyurethane binder and based on 100 parts by weight of said binder, from 2 to 15 parts of a silicone oil, and about 10 to about 60 parts of graphite to provide a hardness of from 20 to 80 on the Durometer D scale.

2. A low-torgue bushing assembly as defined in claim 1 wherein said insert contains a quantity of graphite to provide a hardness of from 30 to 55 on the Durometer D scale.

3. A low-torque bushing assembly as defined in claim 1 wherein said polyuprethane binder is a reaction product of a polyisocyanate and polyester polyol.

4. In a cushioned bushing assembly comprising two rigid tubular members positioned one within the other, a shock resistant insert positioned between said rigid members, said insert comprising a rubber polyurethane binder and based on 100 parts by weight of said binder from 2 to 15 parts of a silicone oil, and about 10 to about 60 parts of graphite to provide a hardness of from 20 to 80 on the Durometer D scale.

5. In a cushioned bushing assembly as defined in claim 4 wherein said insert contains a quantity of graphite to provide a hardness of from 30 to 55 on the Durometer D scale.

6. In a cushioned bushing assembly as defined in claim 4 wherein said polyurethane binder is a prepolymer of a polyisocyanate and a polyol.

7. A shock resistant lubricating composition comprising a rubbery polyurethane binder and based on 100 parts by weight of said binder, from 2 to 15 parts of a silicone oil and 10 to 60 parts of graphite to provide a hardness of from 20 to 80 on the Durometer D scale.

8. A composition as defined in claim 7 comprising a quantity of graphite to provide a hardness of from 30 to 55 on the Durometer D scale.

9. A composition as defined in claim 7 wherein said polyurethane binder is a cast reaction product of a polyisocyanate and a polyether polyol.

10. In a cushioned bushing assembly comprising two rigid tubular members positioned one within the other, a shock resistant insert positioned between said rigid members, said insert comprising a polyurethane casting solidified from a prepolymer of tolylene diisocyanate and tetramethylene ether glycol for a binder, and based on 100 parts by weight of said binder, from 4 to 5 parts of 80/20 tolylene diisocyanate, from 14 to 18 parts of methylene bis-o-chloro aniline, from 10 to 30 parts of graphite, and from 5 to 15 parts of dimethyl silicone oil having a viscosity of about 500.

References Cited in the file of this patent

UNITED STATES PATENTS

| | | |
|---|---|---|
| 2,340,503 | Barenyi | Feb. 1, 1944 |
| 2,563,778 | Fasoli | Aug. 7, 1951 |
| 2,851,316 | Thomson | Sept. 9, 1958 |
| 2,880,027 | Everitt | Mar. 31, 1959 |
| 2,981,573 | Reuter | Apr. 25, 1961 |
| 2,984,963 | Reuter | May 23, 1961 |
| 3,070,408 | Reuter | Dec. 25, 1962 |

UNITED STATES PATENT OFFICE
CERTIFICATE OF CORRECTION

Patent No. 3,171,699　　　　　　　　　　　　　　　　March 2, 1965

Edwin M. Maxey

It is hereby certified that error appears in the above numbered patent requiring correction and that the said Letters Patent should read as corrected below.

Column 6, line 11, for "polyuprethane" read -- polyurethane --; line 16, for "rubber" read -- rubbery --.

Signed and sealed this 24th day of August 1965.

(SEAL)
Attest:

ERNEST W. SWIDER
Attesting Officer

EDWARD J. BRENNER
Commissioner of Patents